United States Patent
Buchanan et al.

[19]

[11] Patent Number: 5,950,179

[45] Date of Patent: Sep. 7, 1999

[54] METHOD AND SYSTEM FOR ISSUING A SECURED CREDIT CARD

[75] Inventors: William B. Buchanan, Novato; Dawn E. Greiner, San Francisco; Charles S. Johnston, San Ramon; Roger J. Van Duinen, Oakland, all of Calif.

[73] Assignee: Providian Financial Corporation, San Francisco, Calif.

[21] Appl. No.: 08/760,148

[22] Filed: Dec. 3, 1996

[51] Int. Cl.[6] .................................................. G06F 17/60
[52] U.S. Cl. .............................................. 705/38; 705/35
[58] Field of Search ....................... 705/35, 38; 235/379, 235/380; 283/108, 57; 380/25

[56] References Cited

U.S. PATENT DOCUMENTS

| | | | |
|---|---|---|---|
| Re. 31,302 | 7/1983 | Stambler | 340/825.34 |
| 3,594,727 | 7/1971 | Braun | 340/825.33 |
| 3,697,693 | 10/1972 | Deschenes et al. | 705/38 |
| 4,194,242 | 3/1980 | Robbins | 705/38 |
| 4,346,442 | 8/1982 | Musmanno | 705/36 |
| 4,454,414 | 6/1984 | Benton | 705/41 |
| 4,590,365 | 5/1986 | Okada | 235/379 |
| 4,718,009 | 1/1988 | Cuervo | 705/38 |
| 4,752,877 | 6/1988 | Roberts et al. | 705/35 |
| 4,774,663 | 9/1988 | Musmanno et al. | 705/36 |
| 4,968,873 | 11/1990 | Dethloff et al. | 235/380 |
| 5,025,138 | 6/1991 | Cuervo | 705/38 |
| 5,206,803 | 4/1993 | Vitagliano et al. | 705/39 |
| 5,477,038 | 12/1995 | Levine et al. | 235/380 |
| 5,590,197 | 12/1996 | Chen et al. | 380/24 |
| 5,710,637 | 1/1998 | Matsumoto | 358/400 |
| 5,724,523 | 3/1998 | Logfield | 705/35 |
| 5,735,550 | 4/1998 | Hinkle | 283/108 |
| 5,762,376 | 6/1998 | Taskett | 283/57 |
| 5,787,404 | 7/1998 | Fernandez-Holmann | 705/35 |

OTHER PUBLICATIONS

Blind Faith Lending, (Lenders to non–traditional customers discovering that these customers are not necessarily riskier than traditional prime–paper borrowers. Collections & Credit Risk, v2, n2, p. 28 Feb. 1997.

It's in the Cards keeping Your College Kids Out Of Debt. Education by Eileen Whitehead. Better Homes And Gardens, Nov. 1996.

Advanta National Bank, Credit Card Application, 1995.
Capital One Bank, Credit Card Application, 1995.
Sterling Bank & Trust Credit Card Application, 1995.

*Primary Examiner*—Allen R. MacDonald
*Assistant Examiner*—M. Irshadullah
*Attorney, Agent, or Firm*—Fish & Richardson P.C.

[57] ABSTRACT

A computer-implemented method for issuing a credit card to a customer who has difficulty qualifying for unsecured credit or who requests a secured credit card. A card request input is received indicating that a customer has made a request for a credit card, and, in response, a credit card account with an initial credit limit is created for the customer. The initial credit limit is stored by computer. A credit card us issued to the customer before receipt of an indication of a deposit to a savings account to secure the credit card. A balance of the savings account is periodically monitored by computer for an initial deposit, and a new credit limit is computed when the initial deposit has been made.

12 Claims, 2 Drawing Sheets

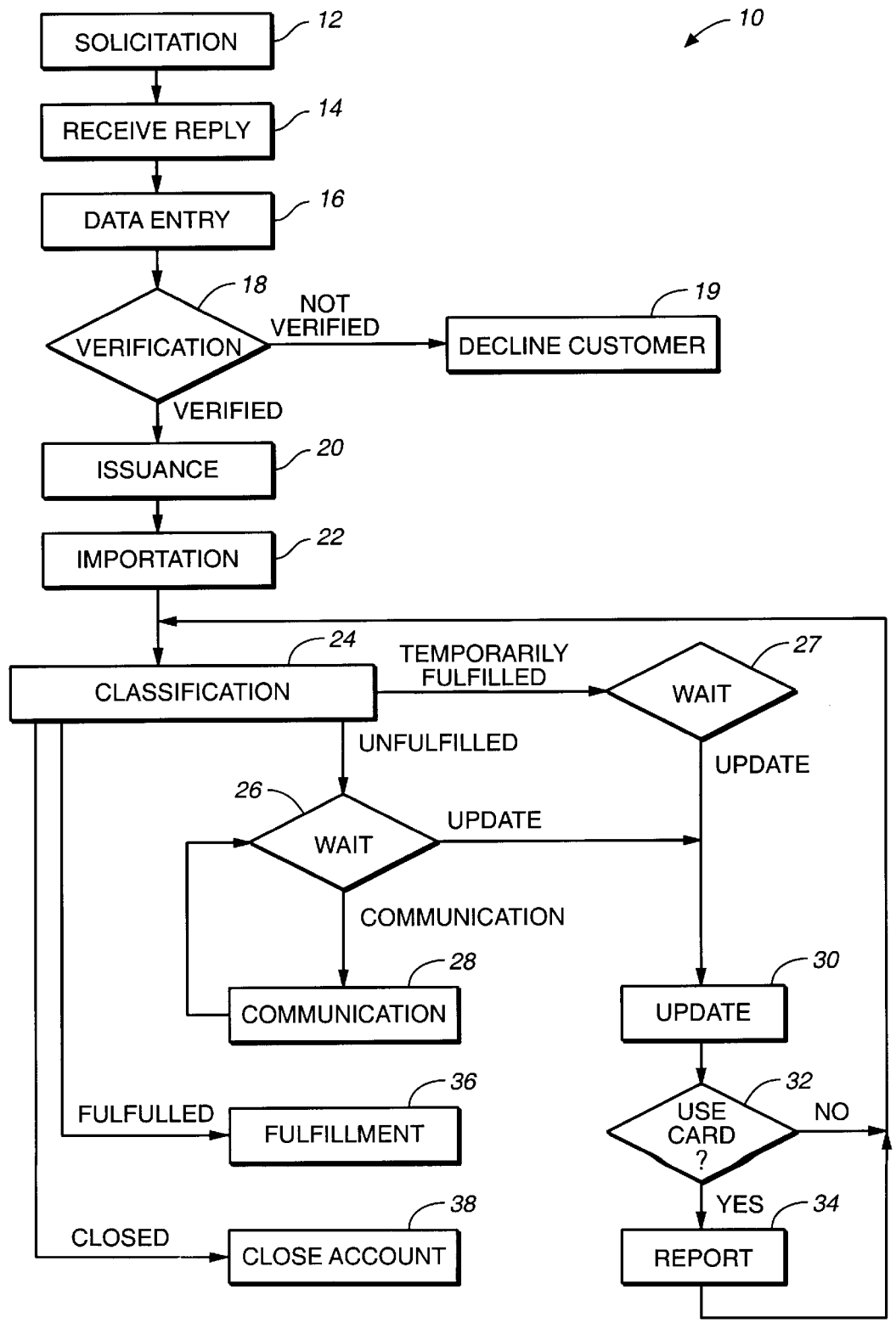
FIG._1

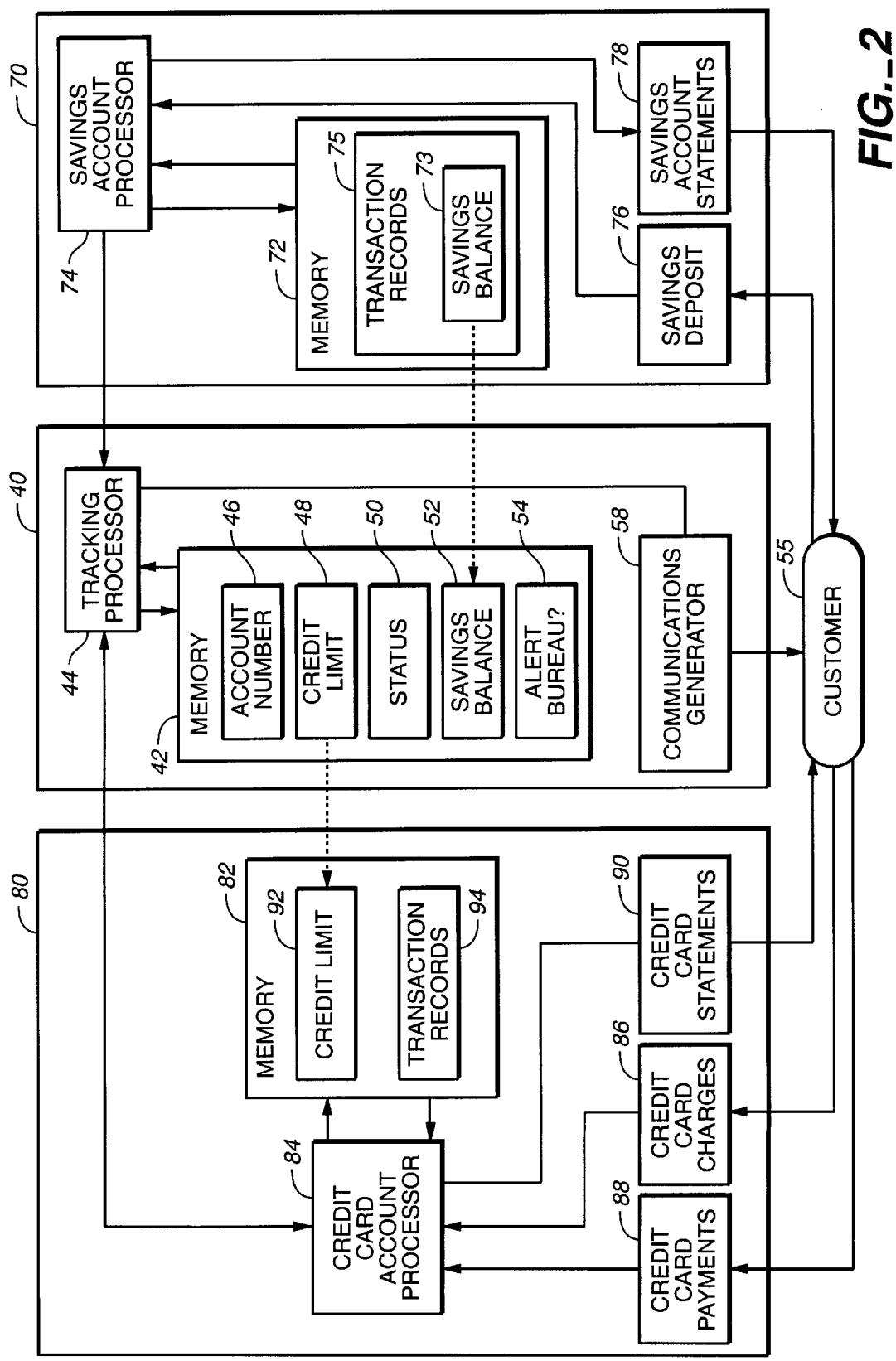
FIG._2

METHOD AND SYSTEM FOR ISSUING A SECURED CREDIT CARD

BACKGROUND OF THE INVENTION

The present invention relates generally to a financial business system, and more particularly to a method and apparatus for issuing a credit card secured by a savings account.

In general, banks provide two types of credit cards: secured and unsecured. An unsecured credit card is backed only by the promise of the cardholder to pay accumulated charges and interest. Unsecured credit cards are issued to individuals having a good credit rating. In contrast, a secured credit card is backed by a security interest in an asset, usually a savings account. If the cardholder defaults, the bank may take the asset to cover all or part of the debt. Secured credit cards are issued to individuals having a fair or poor credit rating or no credit rating.

The secured credit card offers an opportunity for individuals who have a poor or no credit rating to build a good credit history by regularly using the card and making at least the minimum payment each month. The credit limit for a secured credit card is typically tied to the value of the asset. For example, individuals classified as a high risk may receive a credit limit equal to the balance of the savings account, whereas individuals classified as a moderate risk may receive a credit limit equal to twice the balance of the savings account.

Credit cards are issued only to individuals who request them and agree to the terms of a cardholder agreement. Often, the process for finding customers and issuing secured credit cards proceeds as follows. A bank obtains a list of potential customers from a credit agency or other list provider. The bank, or its independent contractor, sorts these potential customers by credit risk to identify candidates for its secured credit card product. Then, the bank mails a solicitation to each candidate. The solicitation informs the candidate that the bank will issue a secured credit card, provided the candidate makes a minimum deposit in a savings account. After sending out the solicitation, the bank waits for a telephonic or written response agreeing to the terms of the cardholder agreement. If the response does not include a deposit for the savings account, the bank may send a reminder letter requesting the deposit to the savings account. Once the minimum balance is deposited, the bank issues the credit card to the customer. Under the cardholder agreement the customer may have only a limited right to make withdrawals from the savings account.

This method of acquiring customers to secure credit card products is not efficient. A substantial number of candidates respond to the solicitation, but fail to make a deposit in the savings account.

SUMMARY OF THE INVENTION

In general, in one aspect, the invention is directed to a computer-implemented method for issuing a credit card to a customer who has difficulty qualifying for unsecured credit or who requests a secured credit card. A card request input is received indicating that a customer has made a request for a secured credit card, and, in response, a credit card account with an initial credit limit is created for the customer. The initial credit limit is stored by computer. A credit card is issued to the customer before receipt of an indication of a deposit to a savings account to secure the credit card. A balance of the savings account is periodically monitored by computer for an initial deposit, and a new credit limit is computed when the initial deposit has been made.

In general, in another aspect, after the card is issued to the customer, the issuance of the credit card to a credit bureau is reported after the customer has either used the credit card, made a payment on the credit card, or made the initial deposit.

In general, in another aspect, after the card is issued to the customer, the credit card account is closed if no deposit is made in the savings account within a predetermined amount of time.

Implementations of the invention may include the following features. The card request input also indicates that the customer has made a promise to make a deposit in a savings account to secure the credit card. The savings account is created with a zero balance, and reporting of the issuance of the credit card to a credit bureau is inhibited until the customer has either used the credit card or has made the initial deposit. The account is marked as unfulfilled when the credit card is issued, and marked as fulfilled after the balance exceeds a predetermined value. The account is passed from a tracking system to a secured credit card processing system when the account is fulfilled. The account is be closed if no deposit is made within a predetermined amount of time. The holder of the credit card and the holder of the savings account are the same entity. An account number is entered into an account number field in a database, the initial credit limit is entered into a credit limit field in the database, and the new credit limit into the credit limit field. After issuance of the credit card, a communication to the customer is generated requesting an initial deposit to the saving account.

The advantages of the invention include the following. The invention increases the efficiency of solicitation by increasing the number of candidates for secured credit cards who make a deposit in the savings account and become actual customers.

BRIEF DESCRIPTION OF THE DRAWINGS

FIG. 1 shows a flow chart of a method of the present invention.

FIG. 2 shows a block diagram of a system of the present invention.

DETAILED DESCRIPTION

Referring to FIG. 1, a method 10 of issuing a secured credit card permits a bank to provide an advance credit card to a customer who might otherwise not qualify for an unsecured credit card account. In particular, the method 10 permits the bank to issue the advance credit card to the customer immediately upon receipt of a promise to make a deposit in a savings account securing the credit card. Thus, the customer may receive and use the advance credit card for a limited period of time. Because the customer has immediate access to a credit card, the customer is more likely to make a deposit to retain the credit card and obtain the benefits of the secured credit card.

In solicitation step 12, the bank (or other issuer) mails solicitations to candidates or prospective customers. The bank, or its independent contractor, obtains a list of potential customers, possibly from one or more credit agencies, sorts the potential customers by level of credit risk, and identifies the candidates for the advance credit card. The bank then mails a solicitation letter to each candidate. The solicitation letter contains promotional material for the secured credit card product and the terms of the cardholder agreement.

The candidate may respond to the solicitation by returning a reply card, by making a telephone call, by connecting to the bank's Internet web site, or otherwise. By signing the reply card or otherwise consenting, the candidate indicates that he or she wishes to receive a credit card and agrees to make a deposit in a savings account. After receiving the reply from the candidate, step 14, the bank enters information about the candidate into an application processing system in a data entry step 16. This information can be obtained from the candidate's response or from the previously constructed list of candidates. For example, information may be transferred to the application processing system by a computer program, such as a database program, from the list of potential customers.

In a verification step 18, the application processing system verifies that the candidate's name and social security number and other identifying information are accurate. For example, the application processing system may order a credit report from a credit agency and compare the credit report to the information from the reply card. The verification step 18 may also include a request for additional documentation, such as a green card if the candidate does not have a social security number. If the application processing system cannot verify the information or indicates that the candidate has falsified information, then the candidate is refused a credit card in a decline customer step 19.

Otherwise, the account is approved and an advance credit card is printed and issued to the new customer in an issuance step 20. Thus, the credit card is issued to the customer after receipt of the promise to make a security deposit, but before the deposit is actually made. The advance credit card has a modest credit limit, such as a few hundred dollars, and it may also have a limited term, such as three months. Initially, the advance credit card account is not reported to credit bureaus and is set to suppress any delinquency that may arise if the customer fails to pay the annual charges. However, the credit card account is reported to a credit bureau if the customer makes a deposit to the savings account or uses the advance credit card. If the customer uses the advance credit card and thereafter fails to make the minimum payments, the customer's credit rating may be affected.

In an importation step 22, account information is imported from the application processing system into an advance credit card tracking system. The account information may include the customer's name, an address, the account number, the credit limit, and the account number of the savings account. The tracking system may be implemented as a centralized or distributed database program running on a computer or a computer network. The tracking system is responsible for periodically recalculating the credit limit of the advance credit card.

In a classification step 24, the account is classified as either unfulfilled, temporarily fulfilled, fulfilled, or closed.

In an unfulfilled account, the customer has not fulfilled the terms of the cardholder agreement. That is, the balance in the savings account is less than the minimum balance required by the cardholder agreement to convert the advance card into a secured card. The minimum balance normally is on the order of several hundred dollars and is generally larger than the initial, modest credit limit on the advance credit card. When the account is initially imported into the tracking system, it is classified as unfulfilled.

In a temporarily fulfilled account, the customer deposited the minimum balance recently, for example, less than forty-five days ago. The account is classified as temporarily fulfilled so that the account may be reclassified as unfulfilled if a deposit check bounces.

In a fulfilled account, the minimum balance has been on deposit for a sufficient period of time.

If the account is classified as unfulfilled, the tracking system proceeds to a waiting step 26. In the waiting step 26, the tracking system waits for a trigger to take some other action. One trigger may be the expiration of a communications timer. Upon the expiration of the communications timer, the tracking system proceeds to a communications step 28.

In the communication step 28, the tracking system generates a communication to the customer encouraging the customer to make a deposit to the savings account. The communication may be an automatically generated letter created by merging a text file with the information from the tracking system. Alternately, the communication may be a telemarketing phone call. If the customer does not make a deposit, then additional communications may follow. A welcome letter is sent on or around the day that the account is opened. In the months after the account is set up, a series of follow-up phone calls and letters occur periodically. The sequence of communications may be adjusted according to experience to maximize the number of customers who make a deposit.

The bank operates systems other than the tracking system. Deposits to the savings account are processed by a savings account system. Similarly, charges and payments to the credit card account are processed by a credit card account system. The savings account system and credit card account system need not operate on the same computer system as the tracking system.

In the update step 30, the account information stored in the tracking system database is updated with information from the savings account database or credit card account database. The trigger for the tracking system to proceed from the waiting step 26 to an update step 30 may be the expiration of an update timer. Alternately, the tracking system may proceed to the update step 30 if so instructed by another computer or by a user.

A summary of the activity in the savings account, such as series of deposit transaction records, may be imported from a savings account database on a daily or weekly basis. A summary of the activity on the credit card, such as a series of charge and payment transaction records, may be imported from a credit card account database on a monthly basis. The tracking system replaces any inaccurate or outdated account information with the recently imported information. If the savings account database and credit card account database do not operate on the same computer system as the tracking system, the tracking system may access the other computer systems in a conventional fashion.

In a usage step 32 following the update step 30, the tracking system determines whether there has been any usage of the advance credit card account, i.e., whether any charges, cash advances, or payments have been made on the credit card. If there has been usage of the advance credit card, or if there have been deposits to the savings account, then in a reporting step 34 the tracking system reports the existence of the account to a credit bureau and starts the process of regularly reporting credit history. Following the update step 30, the tracking system returns to the classification step 24 and reclassifies the account based on the most recent information. For example, if the customer has made a deposit equal to or larger than the minimum balance required, then the account is reclassified as temporarily fulfilled.

If the account is classified as temporarily fulfilled, then the tracking system proceeds to a waiting step 27. In the waiting step 27, the tracking system waits for the arrival of new information to proceed directly to the update step 30.

If the account has been classified as temporarily fulfilled for more than a clearing period, such as forty-five days, then the account is reclassified as fulfilled. The tracking system proceeds to a fulfillment step 36, in which the account is passed from the advance credit card tracking system to a regular secured credit card processing system. As part of this step, a credit bureau may be informed of the existence of the secured credit card account.

The tracking system may also classify the account as closed in the classification step 24. The account will be classified as closed if the term of the advance credit card expires and the customer has not made a deposit and has not used the card. In addition, an account may be closed when the customer requests it be closed, is extremely delinquent, is bankrupt, or dies. The account may also be closed by reason of a default, such as a failure by the customer to pay the minimum balance on the accumulated charges on the credit card. If the account is classified as closed, the tracking system proceeds to a closure step 38. In the closure step 38, any deposits that are in the savings account are used to pay off the balance on the credit card account and the remainder of the deposits are returned to the customer or the customer's successors.

The invention may be implemented as hardware, firmware or software, or a combination of the three. However, preferably the invention is implemented as one or more computer programs executed by one or more processors in a programmable computer system. The programs may be stored in one or more of a random-access memory (RAM), a read-only memory (ROM), or storage media such as a magnetic or optical disk. The programs are preferably implemented in a high level procedural or object-oriented programming language.

Referring to FIG. 2, an advance credit card tracking system 40 may be operated by a bank, or an independent contractor, to provide a customer 65 with an advance credit card. The bank may operate under a license from a credit card association such as VISA or MASTERCARD. The bank may also operate a credit card processing system 80 and a savings account processing system 70. Alternatively, the credit card processing system 80 may be provided by an outside vendor. In addition, the savings account processing system 70 may be operated by a third-party deposit-holding bank. In the latter case, the customer gives the bank a power of attorney or other authority to withdraw funds from the savings account in the event that the customer defaults.

The tracking system 40 is a conventional computer programmed in accordance with this specification. The tracking system 40 includes a tracking memory 42 to store information concerning the advance credit card account, and a programmed tracking processor 44 to compute a credit limit from the account information. The account information stored in tracking memory 42 may include an account number 46, a current credit limit 48, an account status 50 (i.e., unfulfilled, temporarily unfulfilled, fulfilled or closed), a savings account balance 52 and a credit bureau flag 54. The account information may be organized as a set of tables in a relational database.

The tracking system 40 includes a programmed communications generator 56. The communications generator 56 may be a word processing program that operates in conjunction with a database program. Periodically, typically daily, the communications generator 56 generates a list of unfulfilled accounts. For each unfulfilled account, the communications generator 56 accesses a calendar stored in the tracking memory 42 to determine whether to generate a communication to the customer. If the calendar requires a letter to the customer 65, the communications generator 56 merges the account information stored in the tracking memory 42 with a text file. If the calendar requires a telephone call, the communications generator 56 alerts a telemarketer.

The savings account processing system 70 is a programmed computer or computer system including a savings account memory 72 and a programmed savings account processor 74. The savings account memory 72 stores a current savings account balance 73. Each time the customer 65 makes a savings deposit 76 (or a withdraw), the savings account processor 74 updates the savings account memory 72 by adding a transaction record 75 indicating the date of the deposit, the amount of the deposit, and the new savings account balance. Thus, the current savings account balance 73 is stored as a portion of the most recent transaction record 75. The savings account processor 74 periodically generates a savings account statement 78 in a conventional fashion, which is mailed to the customer.

The savings account balance 52 stored in the tracking memory 42 is periodically updated with the savings account balance 73 stored in the savings account memory 72. The tracking processor 44 can communicate with the savings account processor 74 using conventional techniques. The tracking memory 42 and the savings account memory 72 need not be directly connected.

Each time the savings account balance 52 is updated, the tracking processor 44 recalculates the credit limit 48. If there are no deposits in the savings account balance 52, then the credit limit 48 is set to a modest amount, e.g., two hundred dollars. If there are deposits in the savings account balance 52, then the credit limit is increased. The credit limit may be increased by an amount, such as 100%, 150% or 200%, of the savings account balance.

The tracking processor periodically reclassifies the status 50 of the account, normally at least weekly. If the savings account balance 52 is less than the minimum deposit, the tracking processor 44 sets the status 50 as unfulfilled. If the savings account balance 52 has been equal to or greater than the minimum deposit for less then the clearing period, then the status 50 is set as temporarily fulfilled. If the savings account balance 52 has been equal to or greater than the minimum deposit for the clearing period, then the status 50 is set as fulfilled.

The credit card account processing system 80 may be a programmed computer or a computer network including a credit card account memory 82 and a programmed credit card account processor 84. Each time the customer 65 makes a charge 86 or a payment 88 on the credit card, the credit card account processor 84 updates the credit card account memory 82 by adding a transaction record 94 that includes the nature of the transaction, e.g., charge, cash advance or payment, the amount of the transaction, the date of the transaction and the new credit card balance.

The credit card account memory 82 stores a credit limit 92. The credit limit 92 is periodically updated with the credit limit 48 stored in the tracking memory 42. The credit card account processor 84 can communicate with the tracking processor 44 using conventional techniques. The credit card account memory 82 and tracking memory 42 need not be directly connected.

The credit card account processor 84 insures that the credit card balance does not exceed the customer's credit limit. The credit card account processor 84 rejects any transaction that would place the credit card balance over the credit limit 92.

The credit card account processor 84 periodically generates a credit card statement 90 in a conventional fashion, which is mailed to the customer.

The information in transaction records 94 is periodically transferred to the tracking memory 42. For example, the transaction records may be copied to tracking memory 42 each time that the tracking processor 44 communicates with the credit card account processor 84.

Typically, a report to a credit bureau is automatically generated by the credit card processing system 80. However, the tracking system 40 can suppress reports to the credit bureau. The credit bureau flag 54 is initially set to suppress reports on advance credit cards, as has been mentioned. The tracking processor 44 will reset the credit bureau flag 54 to allow reports if the customer has made any credit card charges 86, credit card payments 88, or savings deposits 76.

Each time the credit limit 92 is updated, the credit bureau flag is copied into the credit card account memory 82. Thus, once the customer makes a charge, payment or deposit on the advance credit card, the credit card account processor 84 reports the credit card to the credit bureau.

Tracking processor 44, savings account processor 74, credit card account processor 84 and communications generator 56 may be one program or separate programs in a single computer system, or separate programs in separate computer systems. Each program may be run on a single central processing unit (CPU) or distributed among multiple CPUs.

Tracking memory 42, savings account memory 72 and credit card account memory 82 may be assigned or allocated to random access memory and kept for persistent storage in magnetic or optical diskettes, or other forms of nonvolatile memory. Each memory may have its information stored as objects, as database records, as spreadsheet records, or in other formats.

The advance credit card may be issued to the customer immediately upon receipt of the cardholder agreement, even if the cardholder agreement does not contain a promise to make a deposit in the savings account. In this alternative, the tracking system 40 may be used to inform unsecured credit card customers that they can make deposits to increase their credit limit.

Although the method has been described in reference to a bank, it can be carried out by any credit card issuing entity, such as a credit union.

What is claimed is:

1. A computer-implemented method for issuing a credit card to a customer who has difficulty qualifying for unsecured credit or who requests a secured credit card, comprising:

receiving a card request input indicating that a customer has made a request for a credit card;

creating a credit card account with an initial credit limit for the customer in response to the card request input;

storing the initial credit limit by computer;

issuing a credit card to the customer before receipt of an indication of a deposit to a savings account to secure the credit card;

marking the account as unfulfilled when the credit card is issued;

periodically monitoring by computer a balance of the savings account for an initial deposit;

computing and storing a new credit limit when the initial deposit has been made; and marking the account as fulfilled after the savings account balance exceeds a predetermined value.

2. The method of claim 1 wherein the card request input also indicates that the customer has made a promise to make a deposit in a savings account to secure the credit card.

3. The method of claim 1 further comprising:

inhibiting reporting the issuance of the credit card to a credit bureau until the customer has either used the credit card, made a payment on the credit card, or has made the initial deposit.

4. The method of claim 1 further comprising:

reporting the issuance of the credit card to a credit bureau when the customer has either used the credit card, made a payment on the credit card, or has made the initial deposit.

5. The method of claim 1 further comprising:

passing the account from a tracking system to a secured credit card processing system when the account is fulfilled.

6. The method of claim 1 further comprising:

closing the account if no deposit is made in the savings account within a predetermined amount of time.

7. The method of claim 1 wherein the holder of the credit card and the holder of the savings account are the same entity.

8. The method of claim 1 further comprising:

entering an account number into an account number field in a database;

entering the initial credit limit into a credit limit field in the database; and entering the new credit limit into the credit limit field.

9. The method of claim 1 further comprising generating a communication to the customer requesting an initial deposit.

10. The method of claim 9 wherein the step of generating a communication occurs after issuance of the credit card.

11. A computer-implemented method for issuing a credit card to a customer who has difficulty qualifying for unsecured credit or who requests a secured credit card, comprising:

receiving a card request input indicating that a customer has made a request for a credit card;

creating a credit card account with an initial credit limit for the customer in response to the card request input;

storing the initial credit limit by computer;

issuing a credit card to the customer before receipt of an indication of a deposit to a savings account to secure the credit card;

marking the account as unfulfilled when the credit card is issued;

periodically monitoring by computer a balance of the savings account for an initial deposit;

marking the account as fulfilled after the savings account balance exceeds a predetermined value; and waiting until the customer has either used the credit card, made a payment on the credit card, or made the initial deposit to report the issuance of the credit card to a credit bureau.

12. A computer-implemented method for issuing a credit card to a customer who has difficulty qualifying for unsecured credit or who requests a secured credit card, comprising:

receiving a card request input indicating that a customer has made a request for a credit card;

creating a credit card account with an initial credit limit for the customer in response to the card request input;

storing the initial credit limit by computer;

issuing a credit card to the customer before receipt of an indication of a deposit to a savings account to secure the credit card;

marking the account as unfulfilled when the credit card is issued;

periodically monitoring by computer a balance of the savings account for an initial deposit;

marking the account as fulfilled after the savings account balance exceeds a predetermined value; and closing the credit card account if no deposit is made in the savings account within a predetermined amount of time.

* * * * *